(12) United States Patent
Smook

(10) Patent No.: US 11,073,193 B2
(45) Date of Patent: Jul. 27, 2021

(54) PLANETARY CARRIER HAVING FLEXIBLE BOLTS

(71) Applicants: ZF Friedrichshafen AG, Friedrichshafen (DE); ZF Wind Power Antwerpen N.V., Lommel (BE)

(72) Inventor: Warren Smook, Huldenberg (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 0 days.

(21) Appl. No.: 16/759,736

(22) PCT Filed: Oct. 26, 2018

(86) PCT No.: PCT/EP2018/079414
§ 371 (c)(1),
(2) Date: Apr. 28, 2020

(87) PCT Pub. No.: WO2019/086343
PCT Pub. Date: May 9, 2019

(65) Prior Publication Data
US 2020/0332859 A1    Oct. 22, 2020

(30) Foreign Application Priority Data
Nov. 6, 2017   (DE) ...................... 10 2017 219 614.9

(51) Int. Cl.
*F16H 57/08*     (2006.01)
*F16H 1/28*      (2006.01)
*F16F 1/373*     (2006.01)

(52) U.S. Cl.
CPC ......... *F16H 1/2836* (2013.01); *F16H 57/082* (2013.01); *F16F 1/3732* (2013.01); *F16H 2057/085* (2013.01)

(58) Field of Classification Search
CPC .............................. F16H 57/082; F16H 1/2836
See application file for complete search history.

(56) References Cited

U.S. PATENT DOCUMENTS 3,303,713 A      2/1967   Hicks
3,943,787 A *    3/1976   Hicks ................... F16H 1/2836
                                                  74/410

(Continued)

FOREIGN PATENT DOCUMENTS

CN    102937179 A    2/2013
DE    1500451 A      5/1969

(Continued)

*Primary Examiner* — Erin D Bishop
(74) *Attorney, Agent, or Firm* — Leydig, Voit & Mayer, Ltd.

(57) ABSTRACT

A planetary carrier includes a first cheek, a second cheek, at least one pin, and at least one bushing. A first axial end of the pin is fixed in the first cheek, and a first axial end of the bushing is fixed in the second cheek. At least a portion of the pin protrudes into the bushing, and a second axial end of the pin is fixed in the bushing. A second axial end of the bushing is free-floating, and the bushing forms at least a first cavity and a second cavity. The portion of the pin that protrudes into the bushing protrudes into the first cavity. The bushing forms a wall that separates the first cavity and the second cavity from each other and at least one stiffening rib extends through the second cavity.

7 Claims, 2 Drawing Sheets

(56) References Cited

U.S. PATENT DOCUMENTS

| | | | |
|---|---|---|---|
| 5,649,879 | A | 7/1997 | Kusumoto et al. |
| 6,994,651 | B2* | 2/2006 | Fox .................... F16C 33/605 |
| | | | 475/335 |
| 8,920,284 | B2* | 12/2014 | Fox ....................... F16C 43/04 |
| | | | 475/348 |
| 2013/0184120 | A1 | 7/2013 | Altamura et al. |
| 2017/0227115 | A1 | 8/2017 | Smook et al. |

FOREIGN PATENT DOCUMENTS

| | | |
|---|---|---|
| DE | 19536177 A1 | 3/1997 |
| DE | 102014204421 A1 | 9/2015 |
| DE | 102014214295 A1 | 1/2016 |
| EP | 0003894 A1 | 9/1979 |
| EP | 1028275 A2 | 8/2000 |
| WO | 2011047448 A1 | 4/2011 |

\* cited by examiner

PLANETARY CARRIER HAVING FLEXIBLE BOLTS

CROSS REFERENCE TO RELATED APPLICATIONS

This application is a U.S. National Stage Application under 35 U.S.C. § 371 of International Application No. PCT/EP2018/079414 filed on Oct. 26, 2018, and claims benefit to German Patent Application No. DE 10 2017 219 614.9 filed on Nov. 6, 2017. The International Application was published in German on May 9, 2019 as WO 2019/086343 A1 under PCT Article 21(2).

FIELD

The invention relates to a planetary carrier having a first cheek, a second cheek, at least one pin, and at least one bushing.

BACKGROUND

One way to increase the transmissible power of a planetary gear is to increase the number of planet wheels. However, this reduces the distance between adjacent planet wheels. This is problematic if webs connecting the two cheeks of the planetary carrier to one another run between the planet wheels.

In the absence of the webs of a planetary carrier, all forces between the two cheeks must be transmitted via the planetary bolts. As a result, deformations of the planetary bolts occur. This in turn leads to misalignment of the planetary carriers.

The misalignment can be taken into account in the gearing calculation. The geometry of the gearing is adapted to a misalignment occurring at a certain load so that the misalignment in the gearing is compensated for.

A gearing correction makes it possible to compensate for errors in the tooth meshing at a certain load. In the event of a deviating load, however, errors in the tooth meshing occur again. This is unsatisfactory particularly in the case of gearboxes for wind turbines since said gearboxes must overcome permanently changing loads.

So-called flex pins are known from the prior art. Flex pins are described, for example, in the published patent application DE 1500451. A flex pin is a flexible planetary bolt which compensates for load-related deformations and thus prevents misalignment of a planet wheel. A flex pin consists of a flexible pin on which a bushing is mounted. A planet wheel is rotatably mounted on the bushing. If the pin becomes deformed, this is compensated for by tilting the bushing.

The pin is fixed in a cheek of the planetary carrier. This is the only cheek of the planetary carrier. The use of a second cheek, which would be necessary to absorb higher loads, is not possible due to the construction of a flex pin. This reduces the load-bearing capacity of the planetary carrier.

Publication WO 11047448 A1 discloses a planetary carrier with two cheeks and a bushing which is fixed on both sides in a respective cheek. The bushing serves as a planetary bolt. A pin is screwed into the bushing and does not fulfill a supporting function.

SUMMARY

In an embodiment, the present invention provides a planetary carrier. The planetary carrier includes a first cheek, a second cheek, at least one pin, and at least one bushing. A first axial end of the pin is fixed in the first cheek, and a first axial end of the bushing is fixed in the second cheek. At least a portion of the pin protrudes into the bushing, and a second axial end of the pin is fixed in the bushing. A second axial end of the bushing is free-floating, and the bushing forms at least a first cavity and a second cavity. The portion of the pin that protrudes into the bushing protrudes into the first cavity. The bushing forms a wall that separates the first cavity and the second cavity from each other and at least one stiffening rib extends through the second cavity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
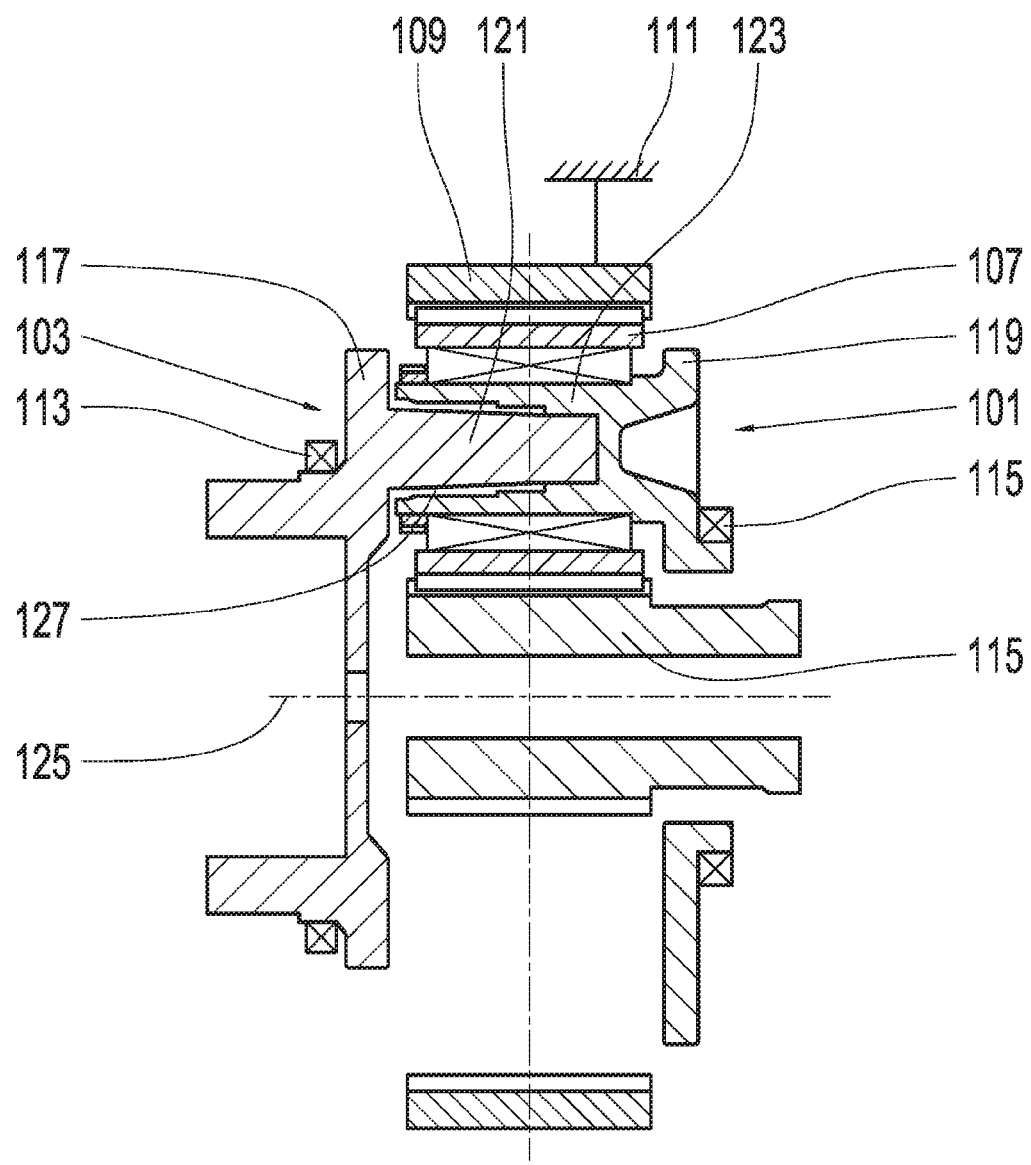
FIG. 1 illustrates a planetary stage.

The present disclosure describes solutions that eliminate disadvantages inherent in the solutions known from the prior art. In particular, the load-bearing capacity of a planetary gear is to be increased with improved suitability for changing loads.

The present disclosure describes a planetary carrier that comprises a first cheek and a second cheek. A cheek is a supporting structure in which planetary bolts are fixed. A rotatable planetary carrier is typically rotatably mounted with each cheek in a non-rotatable structure, such as a gear housing.

The planetary bolts of the planetary carrier according to the disclosure are each formed by a pin and a bushing. Accordingly, the planetary carrier has at least one pin and at least one bushing.

A bushing is a rotationally symmetrical body with a first cavity. The first cavity and the body are rotationally symmetrical about a common axis. Furthermore, the first cavity is open, that is to say, has precisely one opening. The opening is rotationally symmetrical to the same axis.

In particular, at least a portion of the bushing can have the shape of a hollow cylinder.

The bushing and the pin together form a planetary bolt. The bushing serves to receive at least one planet wheel. The planet wheel is provided to be rotatably mounted in the bushing. An axis of rotation of the planet wheel corresponds to the axis of symmetry of the bushing. The bushing forms either an inner ring of a bearing, with which the planet wheel is mounted in the bushing, or a bearing seat, on which an inner ring of the bearing can be fixed. Accordingly, a portion of the surface of the bushing is preferably in the shape of a lateral surface of a straight circular cylinder.

In addition to the bushing, the pin is preferably also rotationally symmetrical to the axis of rotation of the planet wheel.

The pin has two axial ends, a first end and a second end. In total, the pin consists of three pieces: the first end, the second end and an intermediate piece. The first end and the second end are axially spaced apart from one another. The intermediate piece, which connects the two ends to one another, is located between the first end and the second end.

In particular, the intermediate piece can be located between a first and a second plane which run radially, i.e., are oriented orthogonally to the axis of rotation of the planet wheel. The first end of the pin and the intermediate piece are located on different sides of the first plane. Accordingly, the second end of the pin and the intermediate piece are located on different sides of the second plane.

The first end of the pin is fixed in the first cheek. The fixing is preferably rigid, i.e., designed such that the first end of the pin is immovable relative to the first cheek.

The bushing also has two axial ends, a first end and a second end. In total, the bushing consists of three pieces: the first end, the second end and an intermediate piece. The first end and the second end are axially spaced apart from one another. The intermediate piece, which connects the two ends to one another, is located between the first end and the second end.

In particular, the intermediate piece can be located between a third and a fourth plane which run radially, i.e., are oriented orthogonally to the axis of rotation of the planet wheel. The first end of the bushing and the intermediate piece are located on different sides of the third plane. Accordingly, the second end of the bushing and the intermediate piece are located on different sides of the fourth plane.

The first end of the bushing is fixed in the second cheek. This fixing is also preferably rigid, i.e., designed in such a way that the first end of the bushing is immovable relative to the second cheek.

At least a portion of the pin protrudes through the opening into the first cavity of the bushing. Conversely, this means that at least a portion of the bushing encompasses the pin. The same portion also forms at least a portion of the first cavity. The portion of the pin protruding into the bushing comprises the second end of the pin. In particular, the second end of the pin is located in the first cavity.

A radial clearance remains between the pin and the bushing. The clearance extends completely around the axis of rotation of the planet wheel. It is a portion of the first cavity which is not filled by the pin. The clearance is preferably rotationally symmetrical to the axis of rotation. This is equivalent to the fact that the at least one portion of the pin is axially centered in the bushing. Preferably, at least a portion of the clearance is arranged axially between the first cheek or the region of the first cheek in which the first end of the pin is fixed and the region of the bushing in which the second end of the pin is fixed.

The clearance is filled with a flexible medium. In particular, the medium can be a fluid, for example lubricant and/or air.

The second end of the pin is fixed in the bushing. Preferably, the fixation is rigid, i.e., such that the second end of the pin is immovable relative to the portion of the bushing in which the second end is fixed.

According to the disclosure, the bushing is exclusively fixed in the second cheek and in the pin. This means that the second end of the bushing is free-floating, i.e., the second end is fixed solely via the middle portion of the bushing and is held solely by the middle portion. In particular, the second end of the bushing is joined neither to the first cheek nor to the pin.

The second end of the bushing is spaced apart from all other components of the planetary carrier and does not touch them. The second end of the bushing and the first cheek are axially spaced apart from one another. Thus, a free clearance or a clearance which is filled with the flexible medium runs axially between the second end of the bushing and the first cheek.

The planetary bolt formed of the pin and the bushing has the deformation characteristics similar to those of a flex pin. In this way, the bushing can be tilted in its second end relative to the pin. Providing a second cheek, which is not present in flex pins, increases the load-bearing capacity. In addition, the invention makes it possible to vary the axial position of the location at which the second end of the pin is fixed in the bushing. In this way, the deformation behavior can be modified in a targeted manner and adapted to the occurring loads.

Webs which run between the first cheek and the second cheek and connect the first cheek and the second cheek to one another in a force-transmitting manner can have smaller dimensions. As a result, the installation space available for the arrangement of planet wheels increases as a result so that the planet wheels can have larger dimensions and/or their number can be increased. This is at the expense of torsional rigidity of the planetary carrier. However, deformations of the planetary carrier associated therewith are compensated for by the flexibility of the planetary bolt formed of bushing and pin.

Furthermore, it is possible to dispense entirely with webs between the first cheek and the second cheek. A corresponding planetary carrier therefore does not have any such webs. All the force-transmitting connections between the first cheek and the second cheek are then planetary bolts with a pin and a bushing of the type described above, i.e., the planetary bolts assume the tasks of the webs.

Preferably, the bushing forms a radially oriented wall which axially delimits the first cavity. The wall is preferably designed to be continuous, i.e., free of holes or openings. It serves for receiving and fixing the second end of the pin.

In preferred developments, the first cheek and the pin can form physically separate parts or be integrally connected to one another.

In preferred developments, the second cheek and the bushing can also be physically separate parts, or the second cheek and the bushing in a preferred development can be integrally connected to one another.

The mounting of the planetary carrier in the case of an integral design of first cheek and pin as well as second cheek and bushing is limited to the fixing of the second end of the pin in the bushing. In detail, the planetary carrier can be mounted in that the planet wheel is mounted with a planetary bearing on the bushing. The pin is then inserted with its second end into the bushing and fixed. This implies that the pin and the bushing are physically separate from each other.

In order to enable the described assembly, in a preferred development, the first cheek and the second cheek are also designed to be separate, i.e., physically separated from one another. In particular, the first cheek and the second cheek are not integrally connected to each other.

In an alternative preferred development, the first cheek and the second cheek can be integrally connected, by means of webs for instance. This corresponds to the construction of a conventional planetary carrier with bolt receivers into which the planetary bolts are inserted. The first cheek and the pin as well as the second cheek and the bushing are then respectively designed as separate parts.

In a further preferred development, the bushing forms a second cavity in addition to the first cavity. The second cavity is also preferably rotationally symmetrical to the axis of rotation of the planet wheel. The wall described above separates the first cavity and the second cavity from each other. The wall thus extends between the first cavity and the second cavity. At least one stiffening rib extends through the second cavity.

The stiffening rib partially increases the rigidity of the planetary bolt and thus selectively reduces its deformation tendency in a specific direction.

In order to counteract deformations which occur in the case of a helical gearing, the stiffening rib preferably runs radially, i.e., orthogonally to the axis of rotation of the planet wheel. A radial force occurring in the gearing loads the planetary bolt with a torque which would lead to a deformation of the bushing in the direction of an axis of rotation of the planetary carrier. The stiffening rib counteracts this deformation.

The second cavity is preferably open, i.e., has an orifice. Screws for fixing the second end of the pin in the wall can be introduced through the orifice.

A preferred exemplary embodiment of the invention is shown in FIG. 1. Here, matching reference signs indicate identical or functionally identical features.

The planetary stage 101 shown in FIG. 1 comprises a planetary carrier 103, a sun gear 105, planet wheels 107 and a ring gear 109. The ring gear 109 is fixed in a gear housing 111 in a rotationally secure manner. The planetary carrier 103 is rotatably mounted by means of a first bearing 113 and a second bearing 115. The sun gear 105 is also rotatable. The planet wheel 107 is rotatably mounted on the planetary carrier 103 and meshes with the sun gear 105 as well as with the ring gear 109.

The planetary carrier 103 has a two-piece design and consists of a first portion 117 and a second portion 119. Both portions 117, 119 are positively connected to each other. The first portion 117 is mounted by means of the first bearing 113. The second portion 119 is correspondingly mounted by means of the second bearing 115.

The first portion 117 integrally forms pins 121. The second portion 119 integrally forms a bushing 123 for each pin 121. The pin 121 engages in the bushing 123 and is positively fixed there.

The planetary carrier 103 and the sun gear 105 are rotatable about a common axis of rotation 125. Forces which are directed orthogonally to the axis of rotation 125 and act on the pin 121 result in a bending thereof. This is desirable because load balancing in the planetary stage 101 can be brought about by the bending.

A clearance 127 extending between the pin 121 and the bushing 123 allows the bushing 123 to tilt with respect to the pin 121. According to the principle of a flex pin, the angular position of the bushing 123 can thus be kept constant with a torque load of the planetary stage 101.

Figure 2:
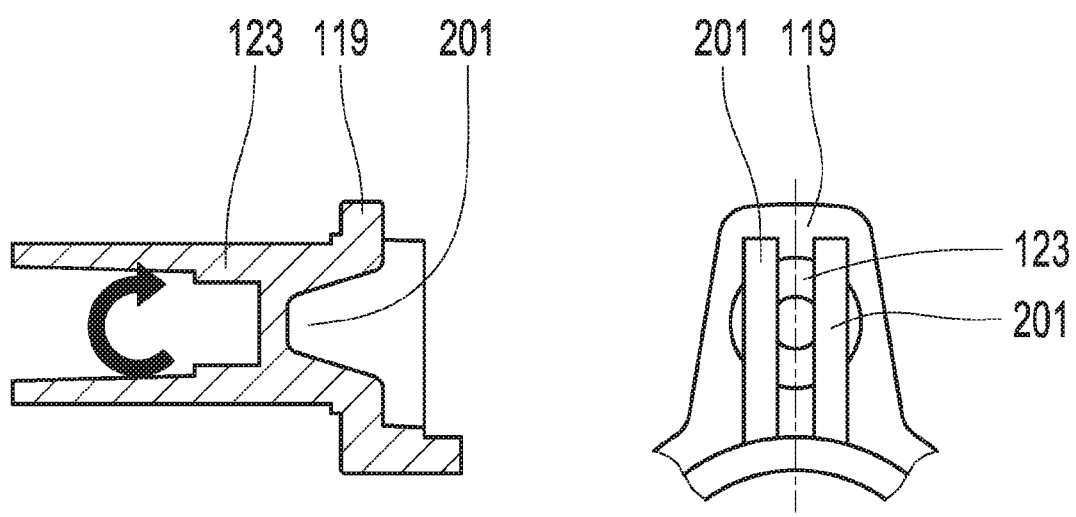
FIG. 2 illustrates reinforcing ribs.

If the planetary stage 101 has a helically geared design, a load on the planetary stage 101 with a torque extending in the direction of the axis of rotation 125 produces a force running in parallel to the axis of rotation 125 within the image plane of FIG. 1. This force also leads to a bending of the pin 121. The result is an angular misalignment of the planet wheel 107 which is accompanied by a defective tooth meshing. In order to counteract this, reinforcing ribs 201 shown in FIG. 2 are provided.

There are two reinforcing ribs 201 per bushing 123. The reinforcing ribs 201 extend radially with respect to the axis of rotation 125. They support the bushing 123 on the second portion 119 of the planetary carrier 103 and thus counteract a tilting of the bushing 123 in exactly one direction, in the direction of the image plane of FIG. 1. Orthogonally thereto, the bushing 123 is unchangeably tiltable.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

101 Planetary stage
103 Planetary carrier
105 Sun gear
107 Planet wheel
109 Ring gear
113 First bearing
115 Second bearing
117 First portion of planetary carrier
119 Second portion of planetary carrier
121 Pin
123 Bushing
125 Axis of rotation
127 Clearance
201 Stiffening rib

The invention claimed is:
1. A planetary carrier, comprising:
a first cheek;
a second cheek;
at least one pin; and
at least one bushing;
wherein a first axial end of the pin is fixed in the first cheek,
wherein a first axial end of the bushing is fixed in the second cheek,
wherein at least a portion of the pin protrudes into the bushing,
wherein a second axial end of the pin is fixed in the bushing,
wherein a second axial end of the bushing is free-floating,
wherein the bushing forms at least a first cavity and a second cavity,
wherein the portion of the pin that protrudes into the bushing protrudes into the first cavity,
wherein the bushing forms a wall that separates the first cavity and the second cavity from each other, and wherein at least one stiffening rib extends through the second cavity.

2. The planetary carrier according to claim 1, wherein the first cheek and the pin are integrally connected to each other.

3. The planetary carrier according to claim 1, wherein the first cheek and the pin are designed as separate parts.

4. The planetary carrier according to claim 1, wherein the second cheek and the bushing are integrally connected to each other.

5. The planetary carrier according to claim 1, wherein the second cheek and the bushing are designed as separate parts.

6. The planetary carrier according to claim 1, wherein the first cheek and the second cheek are designed as separate parts.

7. The planetary carrier according to claim 1, wherein the first cheek and the second cheek are integrally connected to each other.

* * * * *